US011897289B2

(12) United States Patent
Kanamura

(10) Patent No.: US 11,897,289 B2
(45) Date of Patent: Feb. 13, 2024

(54) PNEUMATIC TIRE

(71) Applicant: Toyo Tire Corporation, Itami (JP)

(72) Inventor: Toshihiko Kanamura, Itami (JP)

(73) Assignee: Toyo Tire Corporation, Itami (JP)

( * ) Notice: Subject to any disclaimer, the term of this patent is extended or adjusted under 35 U.S.C. 154(b) by 169 days.

(21) Appl. No.: 17/387,395

(22) Filed: Jul. 28, 2021

(65) Prior Publication Data

US 2022/0048337 A1 Feb. 17, 2022

(30) Foreign Application Priority Data

Aug. 17, 2020 (JP) .................................. 2020-137445

(51) Int. Cl.
*B60C 11/12* (2006.01)
*B60C 11/13* (2006.01)
*B60C 11/03* (2006.01)

(52) U.S. Cl.
CPC .......... B60C 11/12 (2013.01); B60C 11/0304 (2013.01); B60C 11/0309 (2013.01); B60C 11/1236 (2013.01); B60C 11/1392 (2013.01); *B60C 2011/0355* (2013.01); *B60C 2011/133* (2013.01)

(58) Field of Classification Search
CPC . B60C 11/1392; B60C 11/0304; B60C 11/12; B60C 11/1236; B60C 11/0309; B60C 2011/133; B60C 2011/0355
See application file for complete search history.

(56) References Cited

U.S. PATENT DOCUMENTS

| 5,031,680 A * | 7/1991 | Kajikawa .............. B60C 11/033 152/902 |
| 2016/0152087 A1 | 6/2016 | Hayashi |
| 2017/0136830 A1* | 5/2017 | Kuwano ................. B60C 11/11 |
| 2017/0232800 A1* | 8/2017 | Kanematsu ............ B60C 11/04 152/209.18 |
| 2020/0198408 A1* | 6/2020 | Hagihara ........... B60C 11/1384 |

FOREIGN PATENT DOCUMENTS

JP 2016-101886 A 6/2016

* cited by examiner

*Primary Examiner* — Justin R Fischer
*Assistant Examiner* — Philip N Schwartz
(74) *Attorney, Agent, or Firm* — WHDA, LLP

(57) ABSTRACT

In a pneumatic tire, a tread comprises a plurality of main grooves including a first main groove that extends in straight fashion in a tire circumferential direction, and at least one first recess that is recessed toward a first side in a tire axial direction from the first main groove and that is arranged at a portion in the tire circumferential direction of the first main groove, and the at least one first recess comprises a first recess side face that is planar and that extends toward an interior in a tire radial direction from the tread surface, and a first recess bottom that is planar and that extends toward the first side in the tire axial direction from the first main groove so as to intersect the first recess side face.

12 Claims, 6 Drawing Sheets

Fig. 5
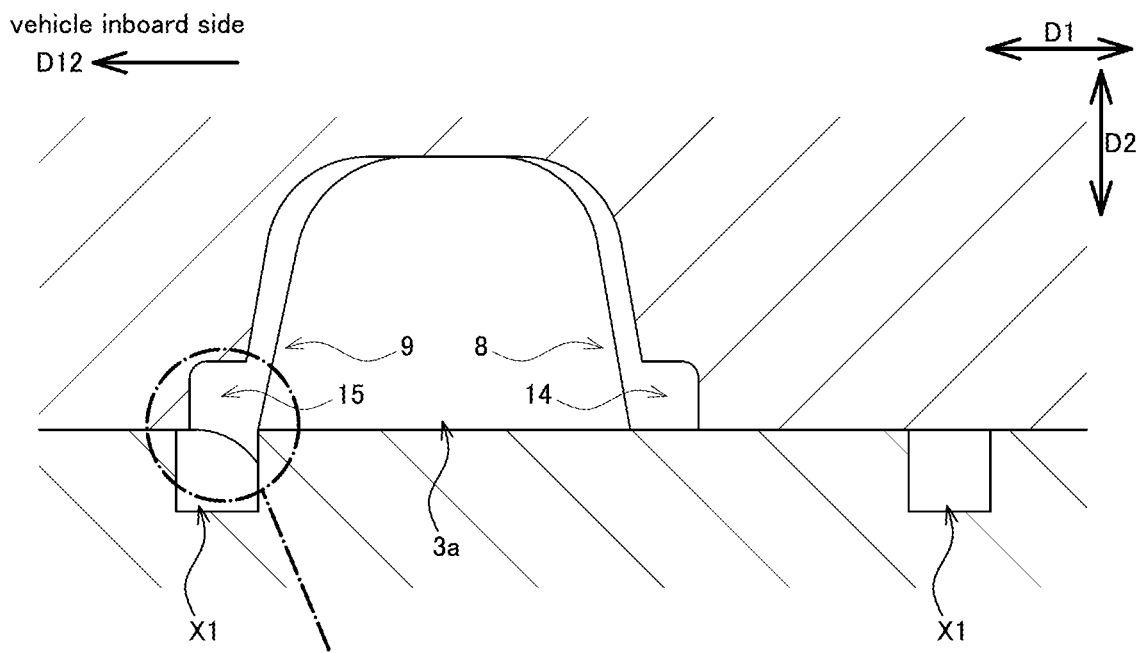
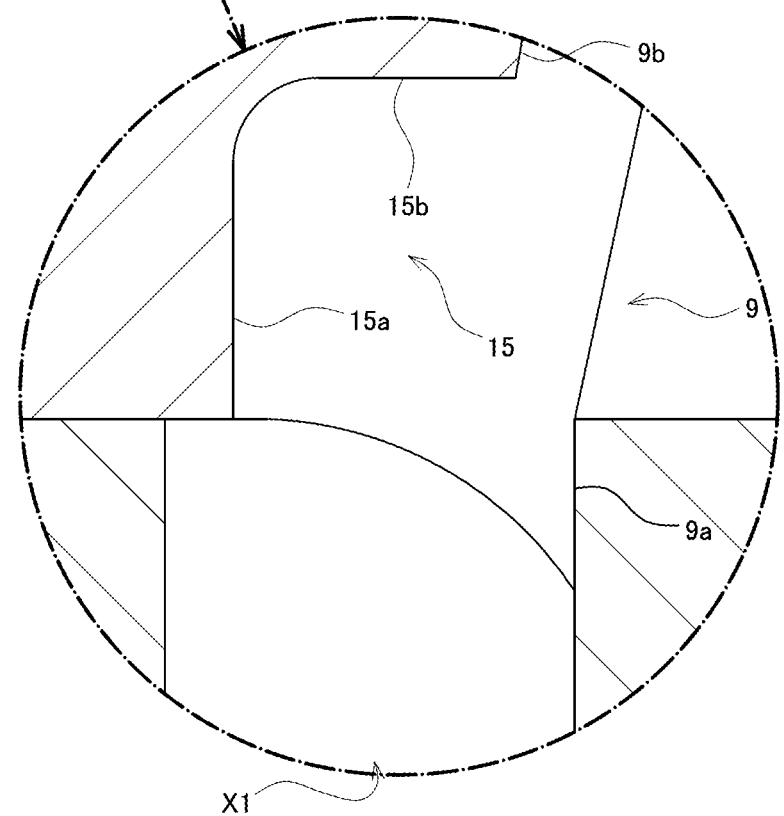

Fig. 6
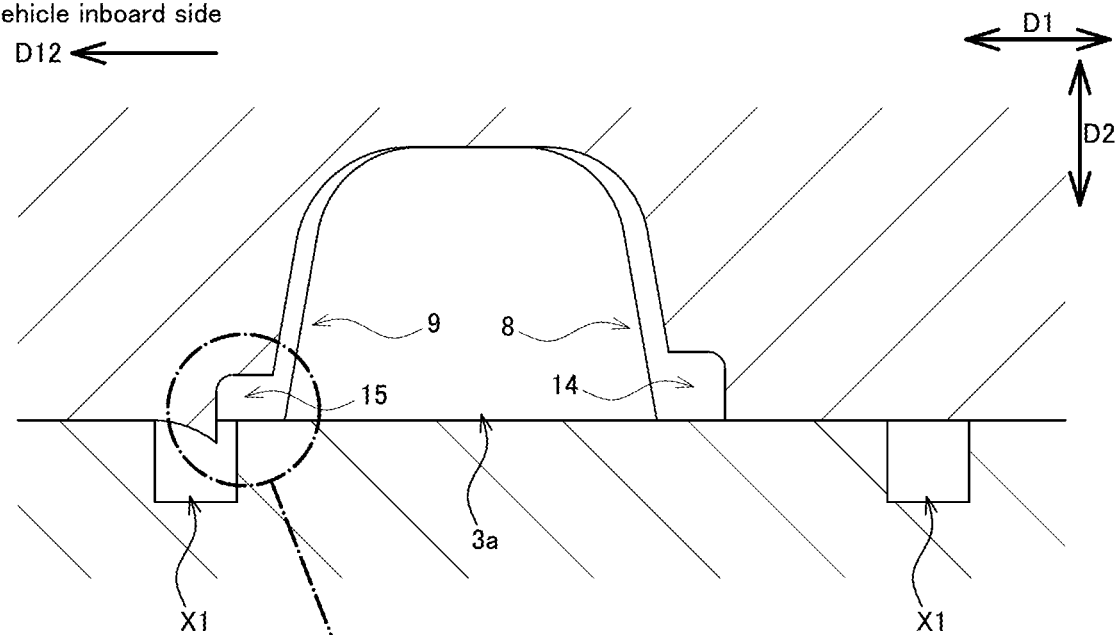
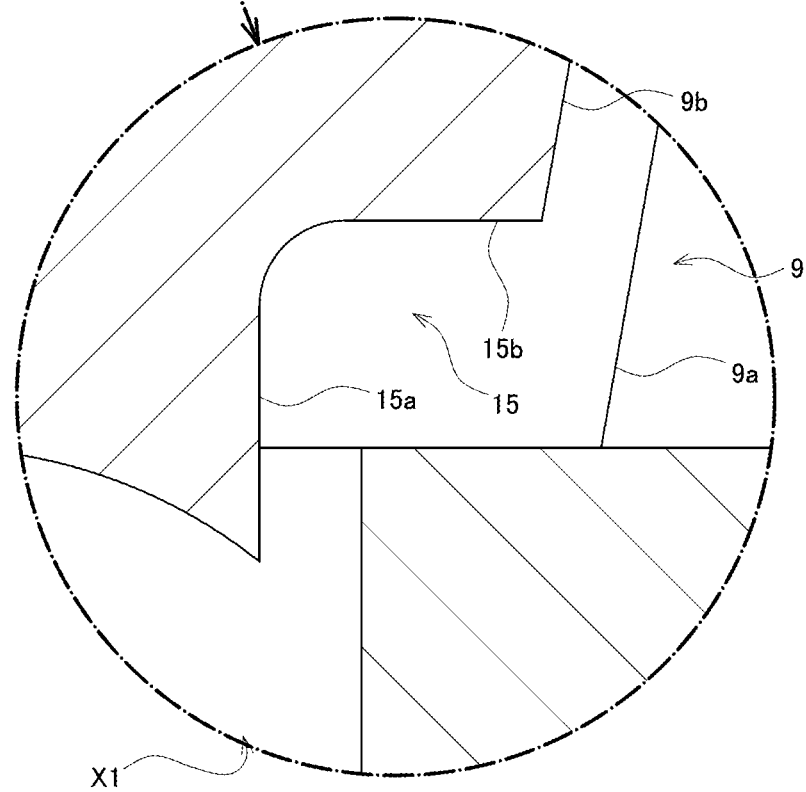

PNEUMATIC TIRE

CROSS REFERENCE TO RELATED APPLICATIONS

This application claims the benefit of priority of Japanese application no. 2020-137445, filed on Aug. 17, 2020, which is incorporated herein by reference.

BACKGROUND OF THE INVENTION

Field of the Invention

The present disclosure relates to a pneumatic tire.

Description of the Related Art

Conventionally a pneumatic tire tread might, for example, comprise a plurality of main grooves extending in straight fashion in the tire circumferential direction, and recesses that are recessed in the tire axial direction relative to the main grooves (e.g., JP 2016-101886 A). Furthermore, to improve the water shedding characteristics of the road surface, a prescribed road might, for example, be provided with rain grooves that extend in parallel fashion with respect to the direction in which a vehicle proceeds thereon.

On such a road, when the groove side face of a main groove extending in straight fashion is captured by a rain groove, there will be a change in the lateral forces produced at the tire (forces in the tire axial direction). As a result, because this will cause occurrence of a phenomenon in which there is a tug on the steering wheel and the vehicle lurches, i.e., the phenomenon of groove wandering, there are situations in which it can interfere with stability in handling (especially stability when driving straight ahead).

At the pneumatic tire associated with JP 2016-101886 A, it so happens that the recess is provided with a sloped surface which is flat and which extends from the tread surface to the groove side face of the main groove. As a result, because the sloped surface guides the groove side face of the main groove toward the rain groove, there is a tendency for the groove side face of the main groove to be captured by the rain groove. There is therefore an increased tendency for the groove wandering phenomenon, for example, to occur.

SUMMARY OF THE INVENTION

It is an object of the present disclosure to provide a pneumatic tire that will make it possible to suppress capture of groove side faces of main grooves by rain grooves.

There is provided a pneumatic tire comprises a tread having a tread surface that comes in contact with a ground;
wherein the tread comprises a plurality of main grooves including a first main groove that extends in straight fashion in a tire circumferential direction, and at least one first recess that is recessed toward a first side in a tire axial direction from the first main groove and that is arranged at a portion in the tire circumferential direction of the first main groove; and
the at least one first recess comprises a first recess side face that is planar and that extends toward an interior in a tire radial direction from the tread surface, and a first recess bottom that is planar and that extends toward the first side in the tire axial direction from the first main groove so as to intersect the first recess side face.

BRIEF DESCRIPTION OF DRAWINGS

FIG. 5 is a drawing which is a sectional view of the location at FIG. 4 and which shows the situation that exists when a groove side face of a main groove is captured by a rain groove; and FIG. 6 is a drawing which is a sectional view of the location at FIG. 4 and which shows the situation that exists when a recess side face of a recess is captured by a rain groove.

DETAILED DESCRIPTION OF THE INVENTION

Below, an embodiment of a pneumatic tire is described with reference to FIG. 1 through FIG. 6. At the respective drawings, note that dimensional ratios at the drawings and actual dimensional ratios are not necessarily consistent, and note further that dimensional ratios are not necessarily consistent from drawing to drawing.

At the respective drawings, first direction D1 is the tire axial direction D1 which is parallel to the tire rotational axis which is the center of rotation of pneumatic tire (hereinafter also referred to as simply "tire") 1, second direction D2 is the tire radial direction D2 which is the direction of the diameter of tire 1, and third direction D3 is the tire circumferential direction D3 which is circumferential with respect to the rotational axis of the tire.

Toward the interior in the tire axial direction D1 means nearer to tire equatorial plane S1, and toward the exterior in the tire axial direction D1 means farther away from tire equatorial plane S1. Note that the tire axial direction D1 may be further subdivided into first side D11, which is also referred to as first axial direction side D11; and second side D12, which is also referred to as second axial direction side D12. Furthermore, the side toward the interior in the tire radial direction D2 is the side which is nearer to the tire rotational axis, and the side toward the exterior in the tire radial direction D2 is the side which is farther away from the tire rotational axis.

Tire equatorial plane S1 refers to a plane that is located centrally in the tire axial direction D1 of tire 1 and that is perpendicular to the rotational axis of the tire; tire meridional planes refer to planes that are perpendicular to tire equatorial plane S1 and that contain the rotational axis of the tire. Furthermore, the tire equator is the line formed by the intersection of tire equatorial plane S1 and the outer surface (tread surface 2a, described below) in the tire radial direction D2 of tire 1.

Figure 1:
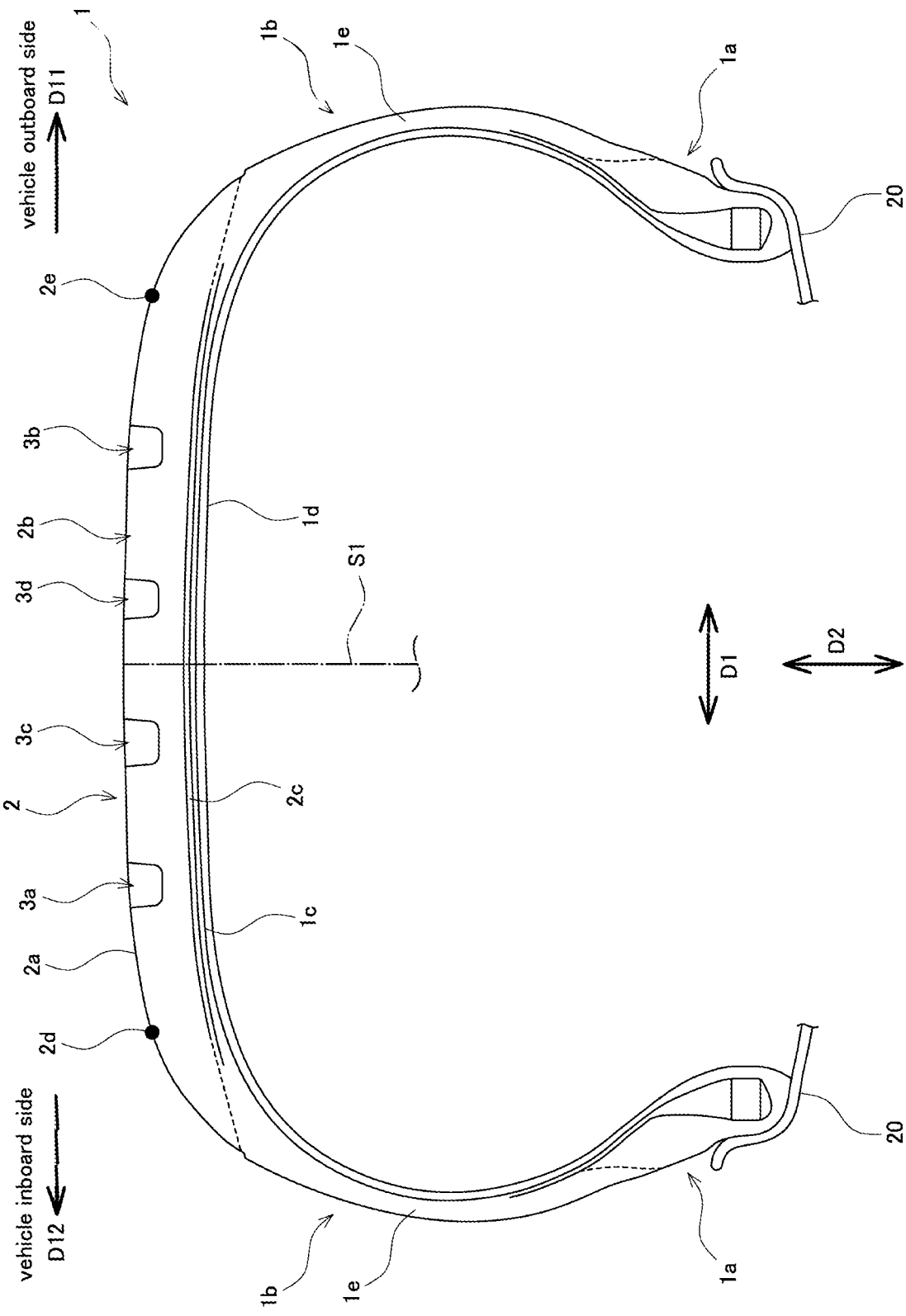
FIG. 1 is a view of a section, taken along a tire meridional plane, of the principal components in a pneumatic tire associated with an embodiment.

As shown in FIG. 1, tire 1 associated with the present embodiment comprises a pair of bead regions 1a at which bead cores are present; sidewalls 1b which extend outwardly in the tire radial direction D2 from the respective bead regions 1a; and tread 2, the exterior surface in the tire radial direction D2 of which contacts the road surface and which is contiguous with the outer ends in the tire radial direction D2 of the pair of sidewalls 1b. In accordance with the present embodiment, tire 1 is a pneumatic tire 1, the interior of which is capable of being filled with air, and which is capable of being mounted on a rim 20.

Furthermore, tire 1 comprises carcass 1c which spans the pair of bead cores, and inner liner 1d which is arranged at a location toward the interior from carcass 1c and which has superior functionality in terms of its ability to impede passage of gas therethrough so as to permit air pressure to be maintained. Carcass 1c and inner liner 1d are arranged in parallel fashion with respect to the inner circumference of the tire over a portion thereof that encompasses bead regions 1a, sidewalls 1b, and tread 2.

Tire 1 has a structure that is asymmetric with respect to tire equatorial plane S1. In accordance with the present embodiment, tire 1 is a tire for which a vehicle mounting direction is indicated, which is to say that there is an indication of whether the left or the right side of the tire should be made to face the vehicle when tire 1 mounted on rim 20. Moreover, the tread pattern formed at tread surface 2a of tread 2 is shaped in asymmetric fashion with respect to tire equatorial plane S1.

The orientation in which the tire is to be mounted on the vehicle is indicated at sidewall 1b. More specifically, sidewall 1b is provided with sidewall rubber 1e which is arranged toward the exterior in the tire axial direction D1 from carcass 1c so as to constitute the tire exterior surface, said sidewall rubber 1e having at the surface thereof an indicator region (not shown) that indicates an orientation in which the tire is to be mounted on the vehicle.

For example, one sidewall 1b, i.e., that which is to be arranged toward the interior when the tire is mounted on the vehicle (hereinafter also referred to as the "inboard side"), might be marked (e.g., with the word "INSIDE" or the like) so as to contain an indication to the effect that it is for the inboard side. Furthermore, for example, the other sidewall 1b, i.e., that which is to be arranged toward the exterior when the tire is mounted on the vehicle (hereinafter also referred to as the "outboard side"), might be marked (e.g., with the word "OUTSIDE" or the like) so as to contain an indication to the effect that it is for the outboard side. In accordance with the present embodiment, first axial direction side D11 is taken to be the vehicle outboard side, and second axial direction side D12 is taken to be the vehicle inboard side.

Tread 2 is provided with tread rubber 2b having tread surface 2a which contacts the road surface, and belt 2c which is arranged between tread rubber 2b and carcass 1c. In addition, present at tread surface 2a is the contact patch that actually comes in contact with the road surface, and the portions within said contact patch that are present at the outer ends in the tire axial direction D1 are referred to as contact patch ends 2d, 2e. Note that said contact patch refers to the tread surface 2a that comes in contact with the road surface when a normal load is applied to a tire 1 mounted on a normal rim 20 when the tire 1 is inflated to normal internal pressure and is placed in vertical orientation on a flat road surface.

Normal rim 20 is that particular rim 20 which is specified for use with a particular tire 1 in the context of the body of standards that contains the standard that applies to the tire 1 in question, this being referred to, for example, as a standard rim in the case of JATMA, a design rim in the case of TRA, or a measuring rim in the case of ETRTO.

Normal internal pressure is that air pressure which is specified for use with a particular tire 1 in the context of the body of standards that contains the standard that applies to the tire 1 in question, this being "maximum air pressure" in the case of JATMA, the maximum value listed at the table entitled "Tire Load Limits at Various Cold Inflation Pressures" in the case of TRA, or "inflation pressure" in the case of ETRTO, which when tire 1 is to be used on a passenger vehicle is taken to be an internal pressure of 180 kPa.

Normal load is that load which is specified for use with a particular tire 1 in the context of the body of standards that contains the standard that applies to the tire 1 in question, this being "maximum load capacity" in the case of JATMA, the maximum value listed at the aforementioned table in the case of TRA, or "load capacity" in the case of ETRTO, which when tire 1 is to be used on a passenger vehicle is taken to be 85% of the load corresponding to an internal pressure of 180 kPa.

Figure 2:
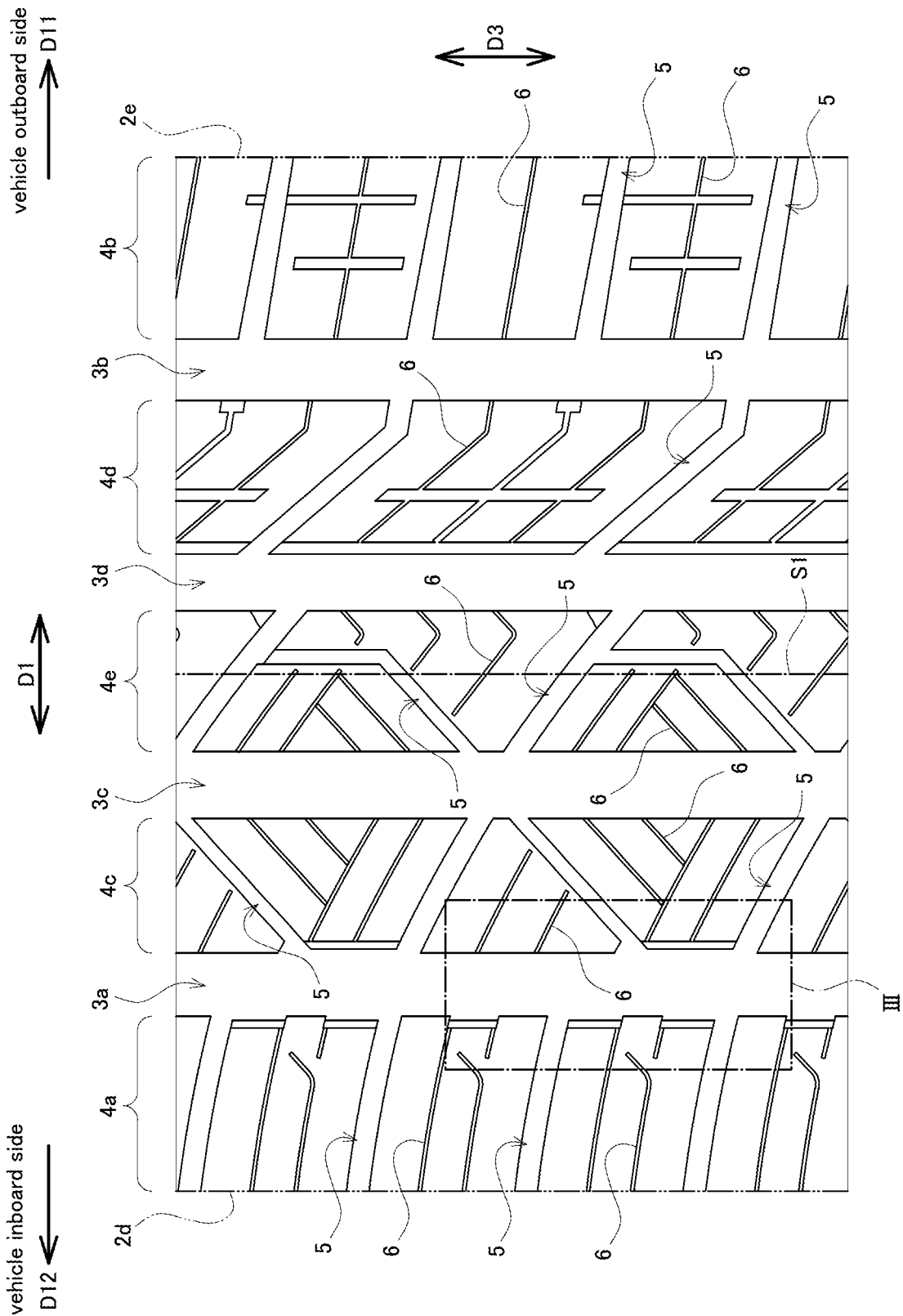
FIG. 2 is a drawing showing the principal components at the tread surface of a pneumatic tire associated with same embodiment as they would exist if unwrapped so as to lie in a single plane.

As shown in FIG. 1 and FIG. 2, tread rubber 2b comprises a plurality of main grooves 3a through 3d that extend in the tire circumferential direction D3. Main grooves 3a through 3d extend continuously in the tire circumferential direction D3. Note that whereas main grooves 3a through 3d extend in straight fashion in the tire circumferential direction D3 in the present embodiment, there is no limitation with respect to such constitution, it also being possible to adopt a constitution in which at least one main groove is repeatedly bent such that it extends in zigzag fashion, or a constitution in which this is, for example, repeatedly curved such that it extends in wavy fashion.

Main grooves 3a through 3d might, for example, be provided with so-called tread wear indicators (not shown) which are portions at which depth of the groove is reduced so as to make it possible to ascertain the extent to which wear has occurred as a result of the exposure thereof that takes place in accompaniment to wear. Furthermore, main grooves 3a through 3d might, for example, have groove widths that are each not less than 3% of the distance (dimension in the tire axial direction D1) between contact patch ends 2d, 2e. Furthermore, main grooves 3a through 3d might, for example, each have a groove width that is not less than 5 mm.

The pair of main grooves 3a, 3b arranged at outermost locations in the tire axial direction D1 are referred to as shoulder main grooves 3a, 3b, and the main grooves 3c, 3d arranged between the pair of shoulder main grooves 3a, 3b are referred to as center main grooves 3c, 3d. Moreover, while there is no particular limitation with respect to the number of main grooves 3a through 3d, the number that are present in the present embodiment is four.

Of the shoulder main grooves 3a, 3b, that main groove 3a which is arranged toward the second axial direction side (the vehicle inboard side) D12 is referred to as first shoulder main groove 3a, and that main groove 3b which is arranged toward the first axial direction side (the vehicle outboard side) D11 is referred to as second shoulder main groove 3b. Furthermore, among the center main grooves 3c, 3d, that main groove 3c which is arranged toward the second axial direction side (the vehicle inboard side) D12 is referred to as first center main groove 3c, and that main groove 3d which is arranged toward the first axial direction side (the vehicle outboard side) D11 is referred to as second center main groove 3d.

Tread rubber 2b comprises a plurality of lands 4a through 4e which are partitioned by the pair of contact patch ends 2d, 2e and the plurality of main grooves 3a through 3d. Moreover, while there is no particular limitation with respect to the number of lands 4a through 4e, the number that are present in the present embodiment is five.

Lands 4a, 4b which are partitioned by contact patch end(s) 2d, 2e and shoulder main groove(s) 3a, 3b are referred to as shoulder lands 4*a*, 4*b*, and lands 4*c* through 4*e* which are partitioned by pair(s) of adjacent main grooves 3*a* through 3*d* are referred to as middle lands 4*c* through 4*e*. Note that lands 4*c*, 4*d* which are partitioned by center main groove(s) 3*c*, 3*d* and shoulder main groove(s) 3*a*, 3*b* are also referred to as quarter lands (also referred to as "mediate" lands) 4*c*, 4*d*, and land 4*e* which is partitioned by the pair of center main grooves 3*c*, 3*d* is also referred to as center land 4*e*.

Among the shoulder lands 4*a*, 4*b*, that land 4*a* which is arranged toward the second axial direction side (the vehicle inboard side) D12 is referred to as first shoulder land 4*a*, and that land 4*b* which is arranged toward the first axial direction side (the vehicle outboard side) D11 is referred to as second shoulder land 4*b*. Furthermore, among the quarter lands 4*c*, 4*d*, that land 4*c* which is arranged toward the second axial direction side (the vehicle inboard side) D12 is referred to as first quarter land 4*c*, and that land 4*d* which is arranged toward the first axial direction side (the vehicle outboard side) D11 is referred to as second quarter land 4*d*.

Lands 4*a* through 4*e* comprise a plurality of ancillary grooves 5, 6. Among ancillary grooves 5, 6, ancillary grooves 5 for which the width dimension at tread surface 2*a* is not less than 1.6 mm are referred to as slits 5; among ancillary grooves 5, 6, ancillary grooves 6 for which the width dimension at tread surface 2*a* is less than 1.6 mm are referred to as sipes 6.

The constitutions of first shoulder main groove 3*a* and lands 4*a*, 4*c* (first shoulder land 4*a* and first quarter land 4*c*) which are contiguous with first shoulder main groove 3*a* will now be described with reference to FIG. 3 and FIG. 4.

Figure 3:
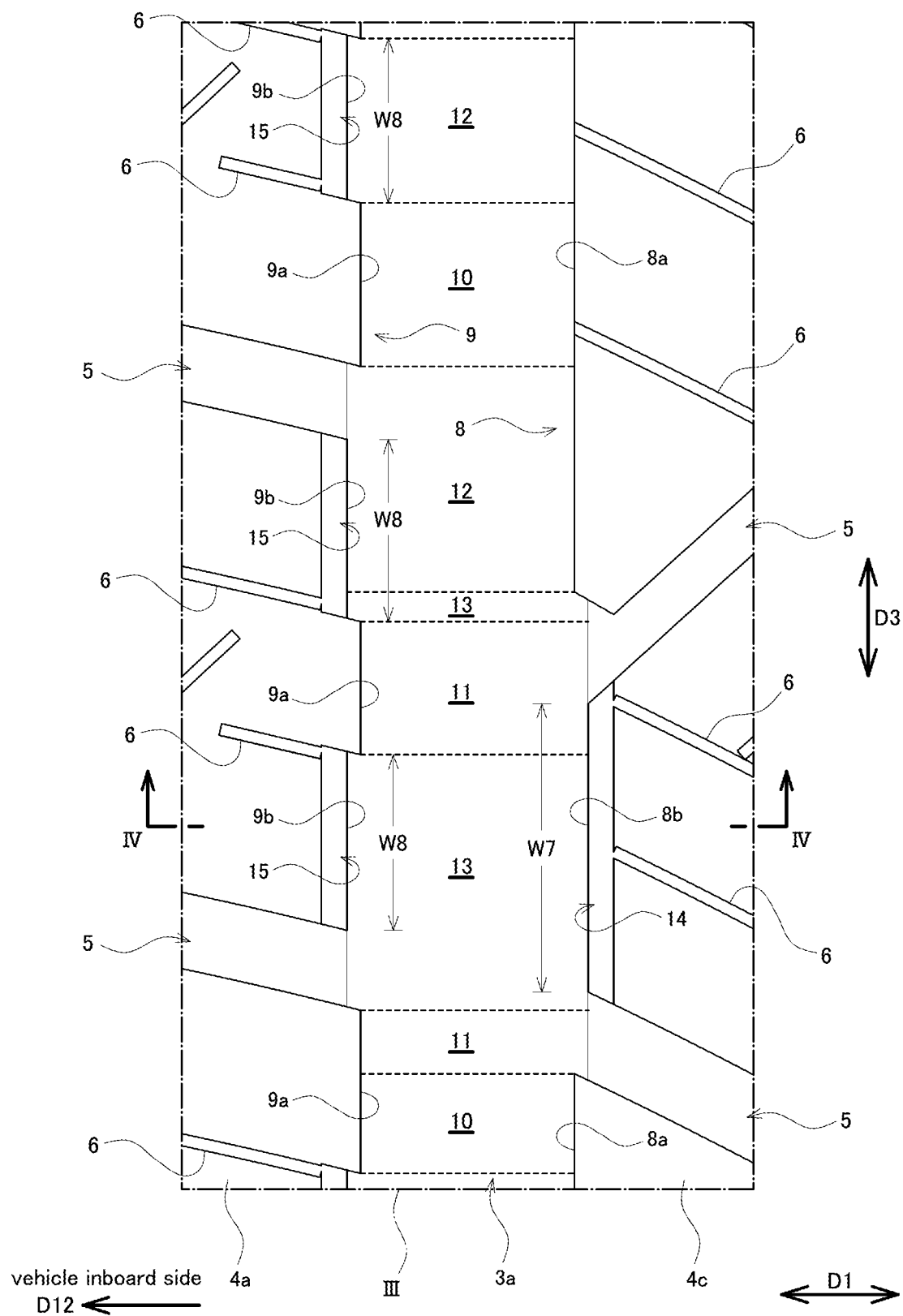
FIG. 3 is an enlarged view of region III in FIG. 2.
Figure 4:
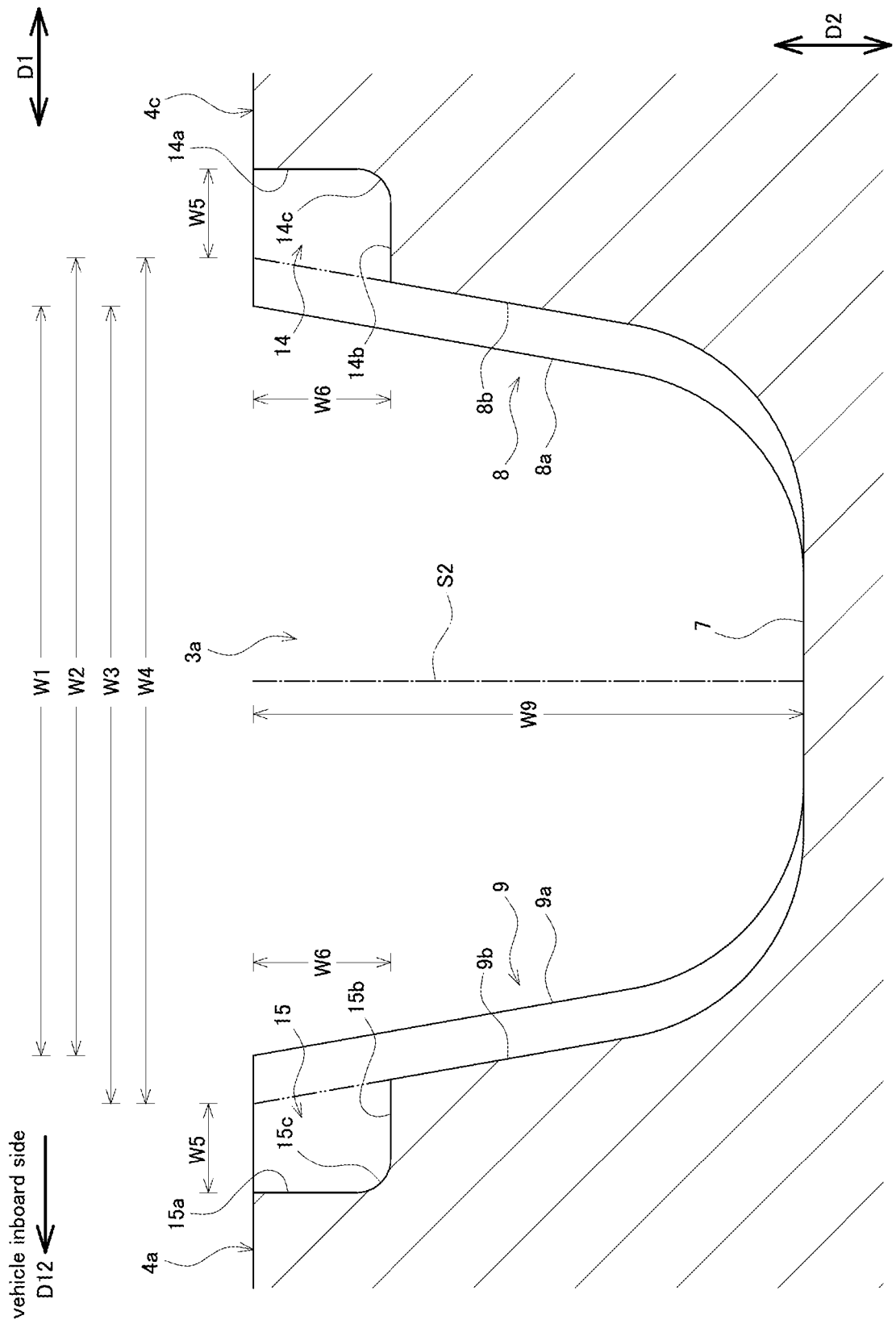
FIG. 4 is an enlarged view of a section taken along IV-IV in FIG. 3.

As shown in FIG. 3 and FIG. 4, first shoulder main groove 3*a* comprises groove bottom 7 which is arranged at the inner end in the tire radial direction D2, and a pair of groove side faces 8, 9 which are separated in the tire axial direction D1. Among the pair of groove side faces 8, 9, that groove side face 8 which is arranged toward the inside in the tire axial direction D1 (the first axial direction side; the vehicle outboard side D11) is referred to as first groove side face 8, and that groove side face 9 which is arranged toward the outside in the tire axial direction D1 (the second axial direction side; the vehicle inboard side D12) is referred to as second groove side face 9.

First groove side face 8 may be formed so as to appear nonflat in shape as viewed in the tire radial direction D2 direction, as is the case in the present embodiment. For example, first groove side face 8 may comprise first inner side face portion 8*a* and first outer side face portion 8*b*. Moreover, the distance in the tire axial direction D1 between first inner side face portion 8*a* and groove reference surface S2 is less than the distance in the tire axial direction D1 between first outer side face portion 8*b* and groove reference surface S2.

Note that groove reference surface S2 is arranged within first shoulder main groove 3*a* and is a plane which is parallel to the tire radial direction D2. While there is no particular limitation with respect thereto, groove reference surface S2 may be a plane which is located at the center in the tire axial direction D1 of first shoulder main groove 3*a*, as is the case in the present embodiment.

Second groove side face 9 may be formed so as to appear nonflat in shape as viewed in the tire radial direction D2 direction, as is the case in the present embodiment. For example, second groove side face 9 may comprise second inner side face portion 9*a* and second outer side face portion 9*b*. Moreover, the distance in the tire axial direction D1 between second inner side face portion 9*a* and groove reference surface S2 is less than the distance in the tire axial direction D1 between second outer side face portion 9*b* and groove reference surface S2.

In addition, first shoulder main groove 3*a* may, as is the case in the present embodiment, comprise four regions 10 through 13 as a result of combination of respective side face portions 8*a*, 8*b*, 9*a*, 9*b*. At FIG. 3, note that boundaries between respective regions 10 through 13 of first shoulder main groove 3*a* are shown in broken line.

For example, first region 10 might be constituted from first inner side face portion 8*a* and second inner side face portion 9*a*, second region 11 might be constituted from first outer side face portion 8*b* and second inner side face portion 9*a*, third region 12 might be constituted from first inner side face portion 8*a* and second outer side face portion 9*b*, and fourth region 13 might be constituted from first outer side face portion 8*b* and second outer side face portion 9*b*.

Width dimension W1 of first region 10 is smaller than width dimension W2 of second region 11 and is smaller than width dimension W3 of third region 12, and width dimension W4 of fourth region 13 is smaller than width dimension W2 of second region 11 and is larger than width dimension W3 of third region 12. Note that width dimension W2 of second region 11 may, as is the case in the present embodiment, be the same as width dimension W3 of third region 12.

Tread 2 comprises first recess 14 which is recessed in the tire axial direction D1 relative to first groove side face 8 of first shoulder main groove 3*a*, and second recess 15 which is recessed in the tire axial direction D1 relative to second groove side face 9 of first shoulder main groove 3*a*. That is, first recess 14 is arranged at first quarter land 4*c*, and second recess 15 is arranged at first shoulder land 4*a*.

Note that width dimensions W1 through W4 of respective regions 10 through 13 are the width dimensions at tread surface 2*a*; where a recess 14, 15 is not present thereat, the width dimension is that which would theoretically exist were it present thereat. That is, width dimensions W2 through W4 of respective regions 11 through 13 at which recesses 14, 15 are present are defined based on the surfaces which are the extensions (double-dash chain line in FIG. 4) of groove side faces 8, 9.

In addition, recesses 14, 15 are partially arranged in the tire circumferential direction D3 at first shoulder main groove 3*a*. First recess 14 may, as is the case in the present embodiment, be recessed in the tire axial direction D1 relative to first outer side face portion 8*b* of first groove side face 8; second recess 15 may, as is the case in the present embodiment, be recessed in the tire axial direction D1 relative to second outer side face portion 9*b* of second groove side face 9.

Where this is the case, second region 11 will be provided with only first recess(es) 14, third region 12 will be provided with only second recess(es) 15, and fourth region 13 will be provided with both first recess(es) 14 and second recess(es) 15. Note that first region 10 is provided with neither first recess(es) 14 nor second recess(es) 15.

Width dimensions W5 of recesses 14, 15 may, as is the case in the present embodiment, be smaller than depth dimensions W6 of recesses 14, 15. Furthermore, length dimensions W7, W8 of recesses 14, 15 may, as is the case in the present embodiment, be larger than width dimensions W5 of recesses 14, 15. Furthermore, length dimensions W7, W8 of recesses 14, 15 may, as is the case in the present embodiment, be larger than depth dimensions W6 of recesses 14, 15.

Length dimension W7 of first recess 14 may, as is the case in the present embodiment, be larger than length dimension W8 of second recess 15. That is, length dimension W7 of first recess 14 which is arranged toward the interior in the tire axial direction D1 may, as is the case in the present embodiment, be larger than length dimension W8 of second recess 15 which is arranged toward the exterior in the tire axial direction D1. Stating this another way, length dimension W7 of first recess 14 which is arranged on the vehicle outboard side D11 may, as is the case in the present embodiment, be larger than length dimension W8 of second recess 15 which is arranged on the vehicle inboard side D12.

Recesses 14, 15 comprise recess side faces 14a, 15a which extend toward the interior in the tire radial direction D2 from tread surface 2a, and recess bottoms 14b, 15b which extend in the tire axial direction D1 from groove side faces 8, 9 of first shoulder main groove 3a. At FIG. 4, note that imaginary surfaces which are extensions of outer side face portions 8b, 9b of respective groove side faces 8, 9 are shown in double-dash chain line.

Recess side faces 14a, 15a are formed so as to be planar. In addition, recess side faces 14a, 15a may, as is the case in the present embodiment, be arranged so as to be perpendicular to tread surface 2a. Note that what is referred to as perpendicular includes not only situations in which recess side faces 14a, 15a are perfectly perpendicular to tread surface 2a but also includes situations in which these are approximately perpendicular such that the angle of intersection between recess side face 14a, 15a and tread surface 2a (more specifically, a plane drawn parallel to the tangent of tread surface 2a at the location of recess side face 14a, 15a) is 85° to 95° (90°±5° or less).

Recess bottoms 14b, 15b are formed so as to be planar. In addition, recess bottoms 14b, 15b may, as is the case in the present embodiment, be arranged so as to be parallel to tread surface 2a. Note that what is referred to as parallel includes not only situations in which recess bottoms 14b, 15b are perfectly parallel to tread surface 2a but also includes situations in which these are approximately parallel such that the angle of intersection between recess bottom 14b, 15b and tread surface 2a (more specifically, a plane drawn parallel to the tangent of tread surface 2a at the location of recess side face 14a, 15a) is 5° or less.

As viewed in a tire meridional section, recess bottoms 14b, 15b are arranged so as to appear to intersect recess side faces 14a, 15a. For example, as viewed in a tire meridional section, recess bottoms 14b, 15b may, as is the case in the present embodiment, be arranged so as to appear to be perpendicular to recess side faces 14a, 15a. Note that what is referred to as perpendicular includes not only situations in which recess bottoms 14b, 15b are perfectly perpendicular to recess side faces 14a, 15a but also includes situations in which these are approximately perpendicular such that the corresponding angle of intersection between recess bottom 14b, 15b and recess side face 14a, 15a is 85° to 95° (90°±5° or less).

Furthermore, recesses 14, 15 may, as is the case in the present embodiment, comprise intermediate surfaces 14c, 15c between recess side faces 14a, 15a and recess bottoms 14b, 15b. In addition, intermediate surfaces 14c, 15c may, as is the case in the present embodiment, be formed in the shapes of curved surfaces; or, for example, they may be formed so as to be planar such that they intersect recess side faces 14a, 15a and recess bottoms 14b, 15b in inclined fashion. Note that it is also possible for recesses 14, 15 not to be provided with intermediate surfaces 14c, 15c, in which case recess side faces 14a, 15a and recess bottoms 14b, 15b might be contiguous.

Furthermore, slit 5 of first quarter land 4c may be arranged so as to extend along the entire length in the tire axial direction D1 of first quarter land 4c. Where this is the case, the outer end in the tire axial direction D1 of slit 5 will be contiguous with first groove side face 8 of first shoulder main groove 3a. In addition, first recess 14 may, as is the case in the present embodiment, extend in the tire circumferential direction D3 so as to mutually connect those slits 5, 5 which, among the slits 5 that are contiguous with first groove side face 8 of first shoulder main groove 3a, are adjacent in the tire circumferential direction D3.

Furthermore, ancillary grooves 5, 6 of first shoulder land 4a may be arranged so as to be contiguous with second groove side face 9 of first shoulder main groove 3a at the inner end in the tire axial direction D1. In addition, second recess 15 may, as is the case in the present embodiment, extend in the tire circumferential direction D3 so as to mutually connect those ancillary grooves 5, 6 (6, 6) which, among the ancillary grooves 5, 6 that are contiguous with second groove side face 9 of first shoulder main groove 3a, are adjacent in the tire circumferential direction D3.

Constitution of pneumatic tire 1 associated with the present embodiment is as described above; action of pneumatic tire 1 associated with the present embodiment is described below with reference to FIG. 2 through FIG. 6.

For example, as shown in FIG. 5, when groove side face 9 of main groove 3a is captured by rain groove X1, groove side face 9 of main groove 3a is entrained by rain groove X1. This produces lateral forces (forces in the tire axial direction D1) at tire 1.

In response thereto, because recess 15 is provided, recess side face 15a of recess 15 is separated from rain groove X1. As a result, because it is only the inner side face portion 9a of groove side face 9 of main groove 3a that is entrained by rain groove X1, this makes it possible to reduce the length of groove side face 9 of main groove 3a that is entrained by rain groove X1. Accordingly, because it will be possible to decrease the magnitude of the lateral forces produced by groove side face 9 of main groove 3a, this make it possible to suppress the change in lateral forces that would otherwise be produced at tire 1.

Furthermore, as shown in FIG. 6, when recess side face 15a of recess 15 is captured by rain groove X1, groove side face 9 of main groove 3a is not entrained by rain groove X1. This makes it possible to reduce the length of the portion that is entrained by rain groove X1. Accordingly, because it will be possible to decrease the magnitude of the lateral forces produced by recess side face 15a of recess 15, this make it possible to suppress the change in lateral forces that would otherwise be produced at tire 1.

Thus, because recesses 14, 15 are recessed in the tire axial direction D1 relative to main groove 3a, it is possible to suppress occurrence of the groove wandering phenomenon. Moreover, because length dimensions W7, W8 of recesses 14, 15 are larger than depth dimensions W6 of recesses 14, 15, it is possible to definitively cause functionality of recesses 14, 15 to be made manifest. To definitively cause functionality of recesses 14, 15 to be made manifest, note that it is preferred that width dimensions W5 of recesses 14, 15 be, for example, not less than 1.0 mm.

What is more, recess bottoms 14b, 15b of recesses 14, 15 are formed so as to be planar and so as to extend in the tire axial direction D1 from groove side faces 8, 9 of first shoulder main groove 3a; and in addition, recess bottoms 14b, 15b of recesses 14, 15 are arranged so as to intersect recess side faces 14a, 15a of recesses 14, 15. Moreover, recess side faces 14*a*, 15*a* of recesses 14, 15 are arranged so as to be perpendicular to tread surface 2*a*.

As a result, as shown in FIG. 6, because it is possible to suppress occurrence of situations in which recess side face 15*a* would otherwise guide groove side face 9 of main groove 3*a* toward rain groove X1, it is possible to suppress capture of groove side face 9 of main groove 3*a* by rain groove X1. Furthermore, because recess side faces 14*a*, 15*a* of recesses 14, 15 are arranged so as to be perpendicular to tread surface 2*a*, it will be possible despite progress of wear to cause width dimensions W5 of recesses 14, 15 to remain constant. As a result, it will be possible to definitively cause functionality of recesses 14, 15 to be made manifest regardless of the degree to which wear has occurred.

Moreover, when groove side face(s) 8, 9 of main groove 3*a* and/or recess side face(s) 14*a*, 15*a* of recess(es) 14, 15 are entrained by rain groove X1, lateral forces are respectively produced at groove side face(s) 8, 9 of main groove 3*a* and/or recess side face(s) 14*a*, 15*a* of recess(es) 14, 15. In addition, when difference(s) between said lateral forces is large, there will be a tendency for the groove wandering phenomenon to occur.

It is therefore preferred as shown in FIG. 2 through FIG. 4 that the sum total of length dimensions W7, W8 of respective recesses 14, 15 be 25% to 50% of the total length in the tire circumferential direction D3 of main groove 3*a*. This will make it possible to suppress occurrence of a difference that might otherwise occur in the magnitude of lateral forces produced by groove side face(s) 8, 9 of main groove 3*a* and the magnitude of lateral forces produced by recess side face(s) 14*a*, 15*a* of recess(es) 14, 15.

Furthermore, whereas groove side faces 8, 9 of main groove 3*a* will be of irregular shape due to wear when wear of tire 1 has progressed, groove side faces 8, 9 of main groove 3*a* are formed such that they are straight in shape during the initial stage of wear at tire 1. Accordingly, there is a tendency for the groove wandering phenomenon to occur during the initial stage of wear at tire 1. It is therefore preferred that depth dimensions W6 of recesses 14, 15 be, for example, not less than 1.5 mm. This will make it possible to cause functionality of recesses 14, 15 to be made manifest during the initial stage of wear at tire 1.

Furthermore, when tire 1 is mounted on a vehicle in such fashion as to have negative camber (the top side of tire 1 is inclined inward), among main grooves 3*a* through 3*d*, the contact patch length (length in the tire circumferential direction D3 of the contact patch) of first shoulder main groove 3*a*, which is that main groove which is arranged most toward the vehicle inboard side D12, will be the largest thereamong. This causes the lateral forces which are produced at first shoulder main groove 3*a* to tend to increase. To address this, because recesses 14, 15 are recessed relative to first shoulder main groove 3*a*, it is possible to suppress occurrence of a situation in which the lateral forces produced at first shoulder main groove 3*a* might otherwise increase.

Note that there is a possibility that the water shedding performance of tire 1 might be reduced if water were allowed to accumulate at recesses 14, 15. To address this, width dimensions W5 of recesses 14, 15 are made smaller than depth dimensions W6 of recesses 14, 15. It is, for example, preferred that width dimensions W5 of recesses 14, 15 be not greater than 1.5 mm.

By so doing, when water within first shoulder main groove 3*a* flows in the tire circumferential direction D3, it will be possible to suppress situations in which recesses 14, 15 might otherwise cause the water to meander in localized fashion in the tire axial direction D1. Accordingly, it will be possible, for example, to suppress reduction in water shedding performance.

Furthermore, because recesses 14, 15 are recessed relative to outer side face portions 8*b*, 9*b* of groove side faces 8, 9, it is possible to increase distances between recess side faces 14*a*, 15*a* of recesses 14, 15 and groove side faces 8, 9 at which recesses 14, 15 do not exist. That is, distances between recess side faces 14*a*, 15*a* of recesses 14, 15 and inner side face portions 8*a*, 9*a* of groove side faces 8, 9 are greater than width dimensions W5 of recesses 14, 15. Where this is the case, it will be possible while suppressing groove side faces 8, 9 of main groove 3*a* from being captured by rain groove X1 to also suppress reduction in water shedding performance.

Furthermore, whereas water within slit 5 flows toward the exterior in the tire axial direction D1, first recess 14 mutually connects the outer ends in the tire axial direction D1 of slits 5, 5. As a result, it is possible to suppress occurrence of a situation in which, after water within slits 5, 5 flows toward the exterior in the tire axial direction D1, said water might accumulate at first recess 14. This will make it possible, for example, to suppress reduction in water shedding performance.

Note that there is a possibility that the rigidity of lands 4*a*, 4*c* might be reduced as a result of provision of recesses 14, 15. To address this, it is for example preferred that depth dimensions W6 of recesses 14, 15 be not greater than 50% of depth dimension W9 of first shoulder main groove 3*a*. This will make it possible to suppress reduction in rigidity at lands 4*a*, 4*c*.

Furthermore, when tire 1 is an outside wheel during a turn, large forces will act on lands 4*b*, 4*d* which are arranged at the vehicle outboard side D11. As a result, there is a possibility that a decrease in rigidity at lands 4*b*, 4*d*, which are those lands among lands 4*a* through 4*e* that are arranged at the vehicle outboard side D11, could cause a reduction in performance with respect to stability in handling during turns.

To address this, recesses 14, 15 are provided at lands 4*a*, 4*c* which are arranged at the vehicle inboard side D12. This makes it possible to suppress reduction in rigidity at lands 4*b*, 4*d* which are arranged at the vehicle outboard side D11. Accordingly, it is possible to suppress reduction in performance with respect to stability in handling during turns.

Note that the respective dimensions, positional relationships, relative magnitudes, and so forth should be understood to be as measured under normal conditions when tire 1 mounted on a normal rim 20 and inflated to normal internal pressure is under no load.

As described above, the pneumatic tire 1 of the embodiment comprises a tread 2 having a tread surface 2*a* that comes in contact with a ground;

wherein the tread 2 comprises a plurality of main grooves 3*a* through 3*d* including a first main groove 3*a* (first shoulder main groove in the embodiment) that extends in straight fashion in a tire circumferential direction D3, and at least one first recess 14 that is recessed toward a first side D11 in a tire axial direction D1 from the first main groove 3*a* and that is arranged at a portion in the tire circumferential direction D3 of the first main groove 3*a*; and the at least one first recess 14*a* comprises a first recess side face 14*a* that is planar and that extends toward an interior in a tire radial direction D2 from the tread surface 2*a*, and a first recess bottom 14*b* that is planar and that extends toward the first side D11 in the tire axial direction D1 from the first main groove 3a so as to intersect the first recess side face 14a.

In accordance with such constitution, first recess side face 14a is formed so as to be planar and extends toward the interior in the tire radial direction D2 from tread surface 2a, and first recess bottom 14b is formed so as to be planar and extends in the tire axial direction D1 from first groove side face 8 of first main groove 3a so as to intersect first recess side face 14a. As a result, because it is possible to suppress occurrence of a situation in which first recess 14 might otherwise guide first groove side face 8 of first main groove 3a toward rain groove X1, it is possible to suppress capture of first groove side face 8 of first main groove 3a by rain groove X1.

Further, as in the present embodiment, it is preferred that the pneumatic tire 1 may include a configuration in wh ich:
a length dimension W7 in the tire circumferential direction D3 of the at least one first recess 14 is greater than a depth dimension W6 in the tire radial direction D2 of the at least one first recess 14.

In accordance with such constitution, because it is possible to reduce the length of first groove side face 8 of main groove 3a that is entrained by rain groove X1, this makes it possible to decrease the magnitude of the lateral forces produced by first groove side face 8 of first main groove 3a. Accordingly, it will be possible to definitively cause functionality of first recess 14 to be made manifest.

Furthermore, it is preferred, as is the case in the present embodiment, that the constitution be such that, at pneumatic tire 1, the aforementioned first recess side face 14a is arranged so as to be perpendicular to the aforementioned tread surface 2a.

In accordance with such constitution, because first recess side face 14a will be arranged so as to be perpendicular to tread surface 2a, it will be possible to effectively suppress occurrence of a situation in which first recess side face 14a might otherwise guide first groove side face 8 of first main groove 3a toward rain groove X1. As a result, it will be possible to effectively suppress capture of first groove side face 8 of first main groove 3a by rain groove X1.

Further, as in the present embodiment, it is preferred that the pneumatic tire 1 may include a configuration in wh ich:
a width dimension W5 in the tire axial direction D1 of the at least one first recess 14 is less than a depth dimension W6 in the tire radial direction D2 of the at least one first recess 14.

In accordance with such constitution, because width dimensions W5 of first recess 14 are made smaller than depth dimensions W6 of first recess 14, when water within first main groove 3a flows in the tire circumferential direction D3 it will be possible to suppress situations in which recess 14 might otherwise cause the water to meander in localized fashion in the tire axial direction D1.

Further, as in the present embodiment, it is preferred that the pneumatic tire 1 may include a configuration in wh ich:
the tread 2 comprises a plurality of slits 5 extending in the tire axial direction D1;
the plurality of slits 5 include a first slit 5 at which an outer end toward a second side D12 in the tire axial direction D1 is contiguous with the first main groove 3a, and a second slit 5 which is adjacent in the tire circumferential direction D3 to the first slit 5 and at which an outer end toward a second side D12 in the tire axial direction D1 is contiguous with the first main groove 3a; and the at least one first recess 14 extends in the tire circumferential direction D3 so as to connect the first slit 5 and the second slit 5.

In accordance with such constitution, first recess 14 connects the outer end in the tire axial direction D1 of a first slit 5 and the outer end in the tire axial direction D1 of a second slit 5. As a result, it is possible to suppress occurrence of a situation in which, after water within first and second slits 5, 5 flows toward the exterior in the tire axial direction D1, said water accumulates at first recess 14.

The pneumatic tire 1 is not limited to the configuration of the embodiment described above, and the effects are not limited to those described above. It goes without saying that the pneumatic tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

(1) The constitution of pneumatic tire 1 associated with the foregoing embodiment is such that recesses 14, 15 are recessed in the tire axial direction D1 relative to first shoulder main groove 3a. However, pneumatic tire 1 is not limited to such constitution. For example, it is also possible to adopt a constitution in which recesses 14, 15 are recessed in the tire axial direction D1 relative to at least one main groove among the plurality of main grooves 3a through 3d. That is, there is no particular limitation with respect to the number and location of main grooves 3a through 3d that are contiguous with recesses 14, 15.

(2) Furthermore, the constitution of pneumatic tire 1 associated with the foregoing embodiment is such that width dimensions W5 of the plurality of recesses 14, 15 are the same. However, pneumatic tire 1 is not limited to such constitution.

For example, it is also possible to adopt a constitution in which width dimensions W5 of recesses 14, 15 are different such that there are a plurality thereof. More specifically, it is also possible to adopt a constitution in which tread 2 comprises a first recess which is recessed in the tire axial direction D1 relative to first groove side face 8 of main groove 3a and at which width dimension W5 is a first distance, and a second recess which is recessed in the tire axial direction D1 relative to first groove side face 8 of main groove 3a and at which a width dimension is a second distance that is greater than the first distance.

(3) Furthermore, the constitution of pneumatic tire 1 associated with the foregoing embodiment is such that it comprises first recess 14 which is recessed toward the interior in the tire axial direction D1 from main groove 3a, and second recess 15 which is recessed toward the exterior in the tire axial direction D1 from main groove 3a. However, pneumatic tire 1 is not limited to such constitution. It is also possible to adopt a constitution in which pneumatic tire 1 is such that, for example, it comprises only said first recess(es) 14, or is such that, for example, it comprises only said second recess(es) 15.

(4) Furthermore, the constitution of pneumatic tire 1 associated with the foregoing embodiment is such that this is a tire for which a vehicle mounting direction is indicated. However, pneumatic tire 1 is not limited to such constitution. For example, it is also possible to adopt a constitution in which pneumatic tire 1 is a tire for which a vehicle mounting direction is not indicated. More specifically, the tread pattern may be a tread pattern that exhibits point symmetry about an arbitrary point on the tire equator, or may be a tread pattern that exhibits line symmetry about the tire equator.

The invention claimed is:

1. A pneumatic tire comprising a tread having a tread surface that comes in contact with a ground, wherein:
the tread comprises a plurality of main grooves including a first main groove that extends in straight fashion in a tire circumferential direction, and at least one first recess that is recessed toward a first side in a tire axial direction from the first main groove and that is arranged at a portion in the tire circumferential direction of the first main groove;
the at least one first recess comprises a first recess side face that is planar and that extends toward an interior in a tire radial direction from the tread surface, and a first recess bottom that is planar and that extends toward the first side in the tire axial direction from the first main groove so as to intersect the first recess side face;
the tread further comprises at least one second recess that is recessed toward a second side in the tire axial direction from the first main groove and that is arranged at a portion in the tire circumferential direction of the first main groove;
the at least one second recess comprises a second recess side face that is planar and that extends toward the interior in the tire radial direction from the tread surface, and a second recess bottom that is planar and that extends toward the second side in the tire axial direction from the first main groove so as to intersect the second recess side face;
the first main groove comprises a pair of groove side faces that are separated in the tire axial direction;
the pair of groove side faces include a first groove side face which is arranged toward the first side in the tire axial direction, and a second groove side face which is arranged toward the second side in the tire axial direction;
the first groove side face comprises at least one first inner side face portion, and at least one first outer side face portion which is arranged toward the first side in the tire axial direction from the at least one first inner side face portion;
the second groove side face comprises at least one second inner side face portion, and at least one second outer side face portion which is arranged toward the second side in the tire axial direction from the at least one second inner side face portion;
the at least one first recess is arranged at the at least one first outer side face portion;
the at least one second recess is arranged at the at least one second outer side face portion;
each of the at least one first inner side face portion and the at least one second inner side face portion extends from the tread surface towards a groove bottom in the tire radial direction;
the first main groove comprises at least one first region, at least one second region, at least one third region, and at least one fourth region;
the at least one first region is made up of the at least one first inner side face portion and the at least one second inner side face portion;
the at least one second region is made up of the at least one first outer side face portion and the at least one second inner side face portion;
the at least one third region is made up of the at least one first inner side face portion and the at least one second outer side face portion; and
the at least one fourth region is made up of the at least one first outer side face portion and the at least one second outer side face portion.

2. The pneumatic tire according to claim 1 wherein:
the tread comprises a plurality of slits extending in the tire axial direction, each slit having a width at the tread surface not less than 1.6 mm;
the plurality of slits include a first slit at which an outer end toward a second side in the tire axial direction is contiguous with the first main groove, and a second slit which is adjacent in the tire circumferential direction to the first slit and at which an outer end toward the second side in the tire axial direction is contiguous with the first main groove; and
the at least one first recess extends in the tire circumferential direction so as to connect the first slit and the second slit.

3. The pneumatic tire according to claim 1 wherein a length dimension in the tire circumferential direction of the at least one first recess is greater than a depth dimension in the tire radial direction of the at least one first recess.

4. The pneumatic tire according to claim 1 wherein:
a length dimension in the tire circumferential direction of the at least one first recess is greater than a depth dimension in the tire radial direction of the at least one first recess; and
a length dimension in the tire circumferential direction of the at least one second recess is greater than a depth dimension in the tire radial direction of the at least one second recess.

5. The pneumatic tire according to claim 1 wherein the first recess side face is arranged so as to be perpendicular to the tread surface.

6. The pneumatic tire according to claim 1 wherein:
the first recess side face is arranged so as to be perpendicular to the tread surface; and
the second recess side face is arranged so as to be perpendicular to the tread surface.

7. The pneumatic tire according to claim 1 wherein a width dimension in the tire axial direction of the at least one first recess is less than a depth dimension in the tire radial direction of the at least one first recess.

8. The pneumatic tire according to claim 1 wherein:
a width dimension in the tire axial direction of the at least one first recess is less than a depth dimension in the tire radial direction of the at least one first recess; and
a width dimension in the tire axial direction of the at least one second recess is less than a depth dimension in the tire radial direction of the at least one second recess.

9. The pneumatic tire according to claim 1 wherein:
the tread comprises a plurality of ancillary grooves extending in the tire axial direction;
the plurality of ancillary grooves include a first ancillary groove at which an outer end toward the first side in the tire axial direction is contiguous with the first main groove, and a second ancillary groove which is adjacent in the tire circumferential direction to the first ancillary groove and at which an outer end toward the first side in the tire axial direction is contiguous with the first main groove; and
the at least one second recess extends in the tire circumferential direction so as to connect the first ancillary groove and the second ancillary groove.

10. The pneumatic tire according to claim 1 wherein:
the at least one first recess not arranged at the at least one first inner side face portion.

11. The pneumatic tire according to claim 1 wherein a length dimension in the tire circumferential direction of the at least one first recess is greater than a length dimension in the tire circumferential direction of the at least one second recess.

12. The pneumatic tire according to claim 1 further comprising an indicator region that indicates an orientation in which the tire is to be mounted on a vehicle, wherein:
the first side in the tire axial direction is an outboard side when the tire is mounted on the vehicle;
the second side in the tire axial direction is an inboard side when the tire is mounted on the vehicle; and
the first main groove is that main groove which among the plurality of main grooves is arranged most toward the second side in the tire axial direction.

\* \* \* \* \*